(12) United States Patent
Riley

(10) Patent No.: US 6,819,254 B2
(45) Date of Patent: Nov. 16, 2004

(54) MONITORING SYSTEM AND METHOD

(75) Inventor: Carl William Riley, Milan, IN (US)

(73) Assignee: Hill-Rom Services, Inc., Wilmington, DE (US)

(*) Notice: Subject to any disclaimer, the term of this patent is extended or adjusted under 35 U.S.C. 154(b) by 293 days.

(21) Appl. No.: 09/825,392

(22) Filed: Apr. 3, 2001

(65) Prior Publication Data

US 2001/0010497 A1 Aug. 2, 2001

Related U.S. Application Data

(63) Continuation of application No. 09/263,038, filed on Mar. 5, 1999, now Pat. No. 6,252,512.

(51) Int. Cl.[7] ............................................. G08B 21/00

(52) U.S. Cl. ...................... 340/665; 340/666; 340/667; 73/760; 73/862.045; 73/862.046

(58) Field of Search .................................. 340/665, 666, 340/667, 657, 658, 573.1; 73/760, 862.045, 862.046; 345/173, 174

(56) References Cited

U.S. PATENT DOCUMENTS

| 4,381,677 A | * | 5/1983 | Ruesch et al. ................. 73/718 |
| 4,526,043 A | | 7/1985 | Boie et al. |
| 4,539,560 A | | 9/1985 | Fleck et al. |
| 4,633,237 A | | 12/1986 | Tucknott et al. |
| 4,953,410 A | | 9/1990 | Tabota |
| 5,008,497 A | * | 4/1991 | Asher .......................... 178/18 |
| 5,209,126 A | | 5/1993 | Grahn |
| 5,220,836 A | | 6/1993 | Harms et al. |
| 5,571,973 A | | 11/1996 | Taylor |
| 5,808,552 A | | 9/1998 | Wiley et al. |
| 5,907,213 A | | 5/1999 | Oshima et al. |
| 5,952,585 A | | 9/1999 | Trantzas et al. |

FOREIGN PATENT DOCUMENTS

| JP | 60222734 | 11/1985 |
| WO | 96/31361 | 10/1996 |

* cited by examiner

Primary Examiner—Julie Lieu
(74) Attorney, Agent, or Firm—Barnes & Thornburg

(57) ABSTRACT

A system including piezoelectric material wherein a force exerted on the piezoelectric material is determined by subjecting the piezoelectric material to an input signal of sweeping frequency and evaluating the response of the piezoelectric material to the applied signal.

77 Claims, 3 Drawing Sheets

MONITORING SYSTEM AND METHOD

This application is a continuation of U.S. application Ser. No. 09/263,038 filed Mar. 05, 1999, now U.S. Pat. No. 6,252,512.

BACKGROUND AND SUMMARY OF THE INVENTION

Piezoelectric materials are well know for their ability to generate an electrical output when they are placed under mechanical stress. The frequency and magnitude of an electric signal developed across such a piezoelectric material are directly proportional to the frequency and magnitude of a force applied to the material. There are characteristics of the piezoelectric material's mechanical system that are analogous to electrical systems. For example, the material's response to a mechanical force attempting to bend it is related to the mechanical force in much the same way an impedance is related to the electrical potential across the impedance. Piezoelectric materials can be characterized by their inductive, capacitive and resistive properties. There are numerous applications of piezoelectric materials' ability to generate electrical signals which vary with applied force. When the applied force is not changing, there is no output from the piezoelectric material.

Piezoelectric materials also undergo mechanical motion when electrical potentials are applied across them. There are several applications that make use of this characteristic for the purpose of changing electrical energy into mechanical energy. A piezoelectric material's ability to react to electrical energy can be used to detect the amount of an applied mechanical force. A piezoelectric device is coupled to a function generator capable of generating, for example, a sine wave of a desired frequency and amplitude. If no external force is applied to the piezoelectric material, the material will deflect back and forth at the same frequency and relative magnitude to the applied signal. If an external mechanical force is applied to the material when the electrical signal is applied, the mechanical force will tend to inhibit the electrically induced motion of the piezoelectric material. This resistance to motion will be reflected back to the electrical system as an impedance to current flow and the applied electrical energy not manifested as motion is dissipated as heat in the piezoelectric material. The source subsystem can be constructed in such a way as to detect this extra impedance, for example, by monitoring changes in current flow, or, in a constant current system, by changes in the voltage across the piezoelectric element. Either way, the force applied to the piezoelectric material is reflected back to the source of the applied electrical potential.

According to one aspect of the invention, a monitoring method comprises providing a first, piezoelectric device which is subject to a force to be monitored, determining the first device's output, and correlating the first device's output with the force.

Illustratively according to this aspect of the invention, determining the first device's output comprises providing electrical signals for exciting the first device and correlating the first device's output with the force comprises determining the first device's response to the electrical signals.

Illustratively according to this aspect of the invention, determining the first device's output and correlating the first device's output with the force comprise sweeping the signal frequency and determining the first device's impedance in response to the swept signal frequency.

Further illustratively according to this aspect of the invention, determining the first device's output comprises providing a switch having a first state corresponding to a dynamic mode of operation of the first device when the force applied to the first device is being substantially modulated and a second state corresponding to a static mode of operation when the force applied to the first device is not being substantially modulated.

Illustratively according to this aspect of the invention, switching of the switch to the second state causes a signal to be applied to the first device and causes the impedance of the first device to the applied signal to be determined.

Further illustratively according to this aspect of the invention, determining the first device's output and correlating the first device's output with the force comprise providing electrical signals for exciting the first device and determining the impedance of the first device to the electrical signals.

Additionally illustratively according to this aspect of the invention, providing electrical signals for exciting the first device and determining the impedance of the first device to the electrical signals comprise sweeping the signal frequency and determining the first device's impedance in response to the swept signal frequency.

Illustratively according to this aspect of the invention, determining the first device's output and correlating the first device's output with the force comprise determining from the impedance the force on the first device.

Illustratively according to this aspect of the invention, the method further comprises determining from the determined force whether an object is on the first device.

Additionally illustratively according to this aspect of the invention, providing a first device comprises providing a plurality of said first devices coupled together in an array.

Illustratively according to this aspect of the invention, providing a first, piezoelectric device comprises providing a flexible piezoelectric film.

Further illustratively according to this aspect of the invention, providing a flexible piezoelectric film comprises providing an array of said first devices.

Illustratively according to this aspect of the invention, providing a first device comprises providing a coaxial cable including a center conductor, a shield, and between the center conductor and shield, a piezoelectric material.

Further illustratively according to this aspect of the invention, providing a first device comprises providing a piezoelectric ceramic transducer.

Additionally illustratively according to this aspect of the invention, providing a plurality of said first devices coupled together in an array further comprises providing a third device for holding the plurality of first devices in the array on a detection surface.

Illustratively according to this aspect of the invention, providing a piezoelectric transducer comprises custom fabricating a piezoelectric transducer to a particular size, shape, and electrical properties.

Illustratively according to this aspect of the invention, the method further comprises orienting the first device at a strategic load-bearing point.

Further illustratively according to this aspect of the invention, providing a first device comprises providing a plurality of first devices coupled together and oriented at a plurality of strategic load bearing points so as to permit an object's location to be determined more accurately.

Additionally illustratively according to this aspect of the invention, determining the first device's output and correlating the first device's output with the force comprise detecting a relatively large signal generated by the first device, then determining if the signal generated by the first device varies at a predetermined rate over a predetermined time, and then concluding that the force is still being applied to the first device.

Further illustratively according to this aspect of the invention, determining the first device's output and correlating the first device's output with the force comprise detecting a relatively large signal generated by the first device, then detecting when the signal abruptly decreases below some minimum threshold, and then determining if a constant force is being applied.

According to another aspect of the invention, a monitoring system comprises a first, piezoelectric device which is subject to a force to be monitored, and a second device for determining the first device's output and for correlating the first device's output with the force.

Illustratively according to this aspect of the invention, the second device comprises a second device for providing electrical signals for exciting the first device and for determining the first device's response to the electrical signals.

Additionally illustratively according to this aspect of the invention, the second device comprises a second device for sweeping the signal frequency and determining the first device's impedance in response to the swept signal frequency.

Additionally illustratively according to this aspect of the invention, the second device comprises a switch for controlling a mode of operation of the second device for determining the first device's output and for correlating the first device's output with the force, the switch having a first state corresponding to a dynamic mode of operation when the force applied to the first device is being substantially modulated and a second state corresponding to a static mode of operation when the force applied to the first device is not being substantially modulated.

Further illustratively according to this aspect of the invention, the second device comprises a signal generator and an impedance determining circuit, switching of the switch to the second state causing a signal to be applied by the signal generator to the first device and causing the second device to determine the impedance of the first device to the applied signal.

Further illustratively according to this aspect of the invention, the second device comprises a second device for sweeping the signal frequency and determining the first device's impedance in response to the swept signal frequency.

Illustratively according to this aspect of the invention, the second device comprises a second device for determining from the impedance the force applied to the first device.

Additionally illustratively according to this aspect of the invention, the second device comprises a second device for determining from the determined force whether an object is on the first device.

Illustratively according to this aspect of the invention, the apparatus comprises a plurality of said first devices coupled together in an array so as to permit the object's location to be determined more accurately.

Additionally illustratively according to this aspect of the invention, the first device comprises a flexible piezoelectric film.

Illustratively according to this aspect of the invention, the flexible piezoelectric film comprises an array of said first devices.

Additionally illustratively according to this aspect of the invention, the first device comprises a coaxial cable including a center conductor, a shield, and between the center conductor and shield, a piezoelectric material.

Illustratively according to this aspect of the invention, the first device comprises a piezoelectric ceramic transducer.

Further illustratively according to this aspect of the invention, the first devices are formed into an array, the apparatus further comprising a third device for holding the plurality of first devices in the array on a detection surface.

Additionally illustratively according to this aspect of the invention, the piezoelectric transducer is custom fabricated to a particular size, shape, and electrical properties.

Illustratively according to this aspect of the invention, the first device is oriented at a strategic load-bearing point.

Illustratively according to this aspect of the invention, the apparatus comprises a plurality of first devices coupled together and oriented at a plurality of strategic load bearing points so as to permit an object's location to be determined more accurately.

Illustratively according to this aspect of the invention, the second device comprises a second device for detecting a relatively large signal generated by the first device, placing the second device in a second state when the relatively large signal from the first device is detected, determining if the signal generated by the first device then varies at a predetermined rate over a predetermined time, and then concluding that an object is still reposing on the first device.

Illustratively according to this aspect of the invention, the second device comprises a second device for detecting a relatively large signal generated by the first device, placing the second device in a second state when the signal abruptly decreases below some minimum threshold, immediately switching to the second mode, and determining if a constant force is being applied.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
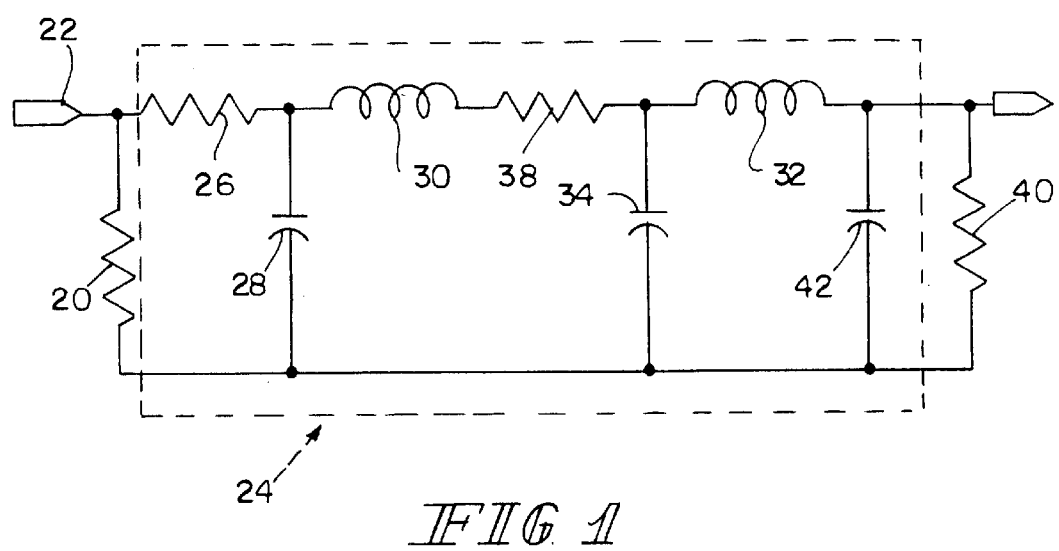
FIG. 1 illustrates an electrical equivalent circuit of a piezoelectric device which assists in understanding the invention.

Referring now to FIG. 1, a resistance 20 is coupled across a signal source 22 in parallel with a piezoelectric transducer 24 under test. Resistance 20 illustratively has a value of 50 Ω. The input DC series resistance of the terminals of the piezoelectric transducer 24 is modeled by a resistance 26. Resistance 26 illustratively has a value of 1 ohm. The input termination capacitance of the terminals of the piezoelectric transducer 24 is modeled by a capacitance 28. This capacitance has a value of, for example, 0.15 $\mu F$. The reactance to changing current flow through the piezoelectric transducer 24 is modeled by two series inductances, 30 and 32 and a shunt capacitance 34. Capacitance 34 illustratively has a value of 0.15 µF. An internal distributed resistance of the piezoelectric transducer 24 is modeled by a resistance 38. Resistance 38 illustratively has a value of 10 Ω. The output DC termination resistance of the terminals of the piezoelectric transducer 24 is modeled by a resistance 40. Resistance 40 illustratively has a value of 2.7K Ω. The output termination capacitance of the terminals of the piezoelectric transducer 24 is modeled by a capacitance 42 which also illustratively has a value of 0.15 µF.

Figure 2:
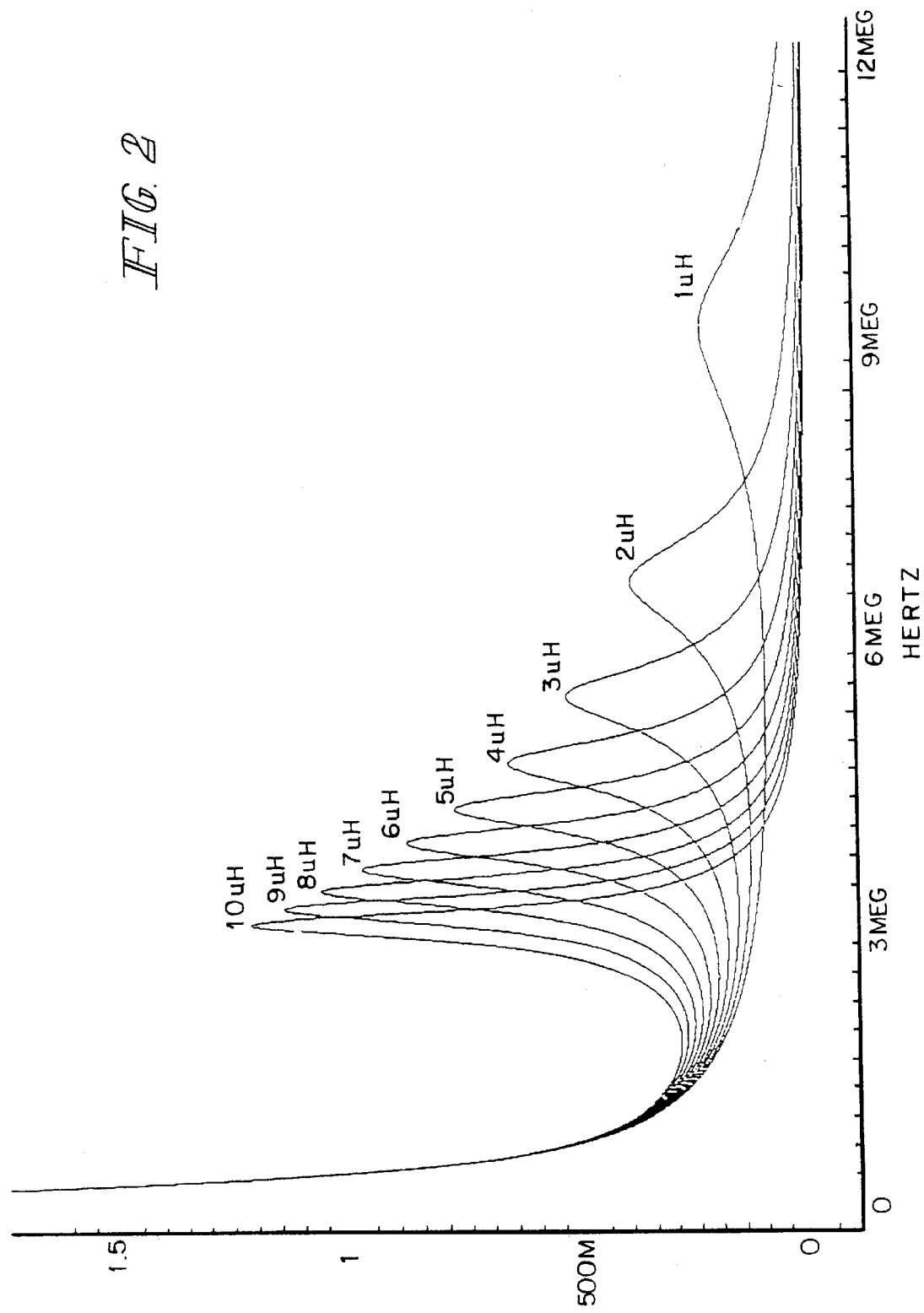
FIG. 2 illustrates frequency response of the system illustrated in FIG. 1 as an applied electrical signal's frequency is swept from 1000 Hz to 12 MHZ; and, FIG. 3 illustrates a partly fragmentary perspective, partly block diagram of a system constructed according to the invention.

The effects of external forces upon piezoelectric transducer 24 can be appreciated from an analysis of this model. Changing only the values of the inductances 30 and 32 and keeping all other component values constant will vary the amplitude of the voltage across resistance 40. Changing the frequency of the applied electrical signal causes a change in the transducer 24's characteristic impedance. Changes in the impedance of the system can be correlated with changes in its mechanical analog. FIG. 2 illustrates the transducer 24's frequency responses in the frequency range $1 \text{ KHz} \leq f \leq 12 \text{ MHz}$. Each trace is the result of a sweep for a different value of inductances 30, 32 in the model. Results for inductance values from 1 to 10 µH in 1 µH steps are included.

As FIG. 2 illustrates, the frequency response changes with the change in the inductance. Also, as expected, the frequency of peak magnitude changes with changes in the inductance. In practice, these characteristics can be used for detection of a static applied force on a piezoelectric transducer 24 resulting in a sensor device much like a load beam. By connecting a controllable voltage source to piezoelectric transducer 24, and sweeping the signal frequency, the piezoelectric transducer 24's reactance to the signal can be determined, and from the reactance the amount of pressure that is being applied to the piezoelectric transducer 24. Testing pressure can be applied in the form of gas pressure, water pressure, other fluid pressure, or the mass of an object such as, for example, a patient lying still in a hospital bed. Sensors can be constructed using, for example, sheet piezoelectric transducers 24, coaxial cable piezoelectric transducers 24, or ceramic piezoelectric transducers 24.

Devices incorporating piezoelectric transducers 24 can be used as bed exit or patient monitoring systems on, for example, hospital beds. Two different modes of operation can be realized. In a first, dynamic mode of operation, motion of the object, for example, a patient in a hospital bed, modulates the force on the piezoelectric transducer 24, causing the piezoelectric transducer to generate an electric signal. Filtering and signal detection algorithms permit the presence of the object and, where a plurality of piezoelectric transducers 24 are used, the location of the object, to be determined accurately. A limitation of this mode of operation is that when the object is not modulating the applied force, that is, not moving, the signal from the piezoelectric transducer 24 practically disappears. Under these circumstances, operation in a second, static mode is indicated. In the situation where the object is still on the sensor but not moving, the detection system switches to the static mode of operation. A signal is applied to the piezoelectric transducer and the characteristic impedance is measured. As described before, this characteristic impedance is used to determine the pressure being (or not being) applied to the sensor by the object (or lack of object). A determination is then made if the object is still on the bed surface or not.

Other algorithms can be applied to increase the reliability of the subject location method and apparatus. As the object moves toward the edge of the bed, a relatively large signal is generated by the piezoelectric transducer 24. This relatively large signal puts the detection system on notice or arms it. If the signal then varies, for example, diminishes, at a predetermined rate over a predetermined time, the detection system algorithm concludes that the object is still on the surface of the bed and there is no exit. If however, the signal created by the object's movement toward the edge of the bed abruptly changes to zero or below some minimum threshold, the system algorithm immediately switches to the above-described static mode to determine if a constant pressure is being applied or if, instead, the bed is empty. This reduces the number of false alarms which would otherwise result from the object rolling over in bed and then lying still.

Sensitivities to mechanical motion are dependent upon mechanical sensitivities of the piezoelectric transducers 24, for example, sheets, cables or ceramic transducers, and the material used. Ceramic transducers 24 are manufactured by many suppliers who custom fabricate different sizes, shapes, electrical and physical characteristics. An array of such ceramic piezoelectric transducers 24 arranged across the detection surface can be constructed using a pad or other mechanism for holding the piezoelectric transducers 24 in place. The piezoelectric transducers 24 can also be placed at strategic load bearing points, similar to a traditional load cell application in a weight measurement device. Piezoelectric film transducers 24 are flexible and relatively inexpensive. Again, many suppliers custom fabricate shapes, thicknesses and impregnation of different types of materials. A sheet of such material or an array of isolated sensors made from a polymer impregnated sensor can be fabricated into a suitable detection system. A polymer coaxial cable manufactured by AMP. (Part nos. 0-1001697-0 and 0-1002399-0) is a traditional coaxial cable, but the electrical insulator between the center conductor and the shield is a piezoelectric polymer. The shield provides a high level of electrostatic isolation, and its configuration makes installing standard BNC connectors relatively straightforward. However, its use in static mode applications is inhibited due to the already physical containment of the piezoelectric material. Its construction incorporating the shield and center conductor tends to reduce the effects of external forces applied to the piezoelectric polymer insulator, making static mode detection a less than optimal strategy. However, as a component of a dynamic mode detector, this material is very effective.

Figure 3:
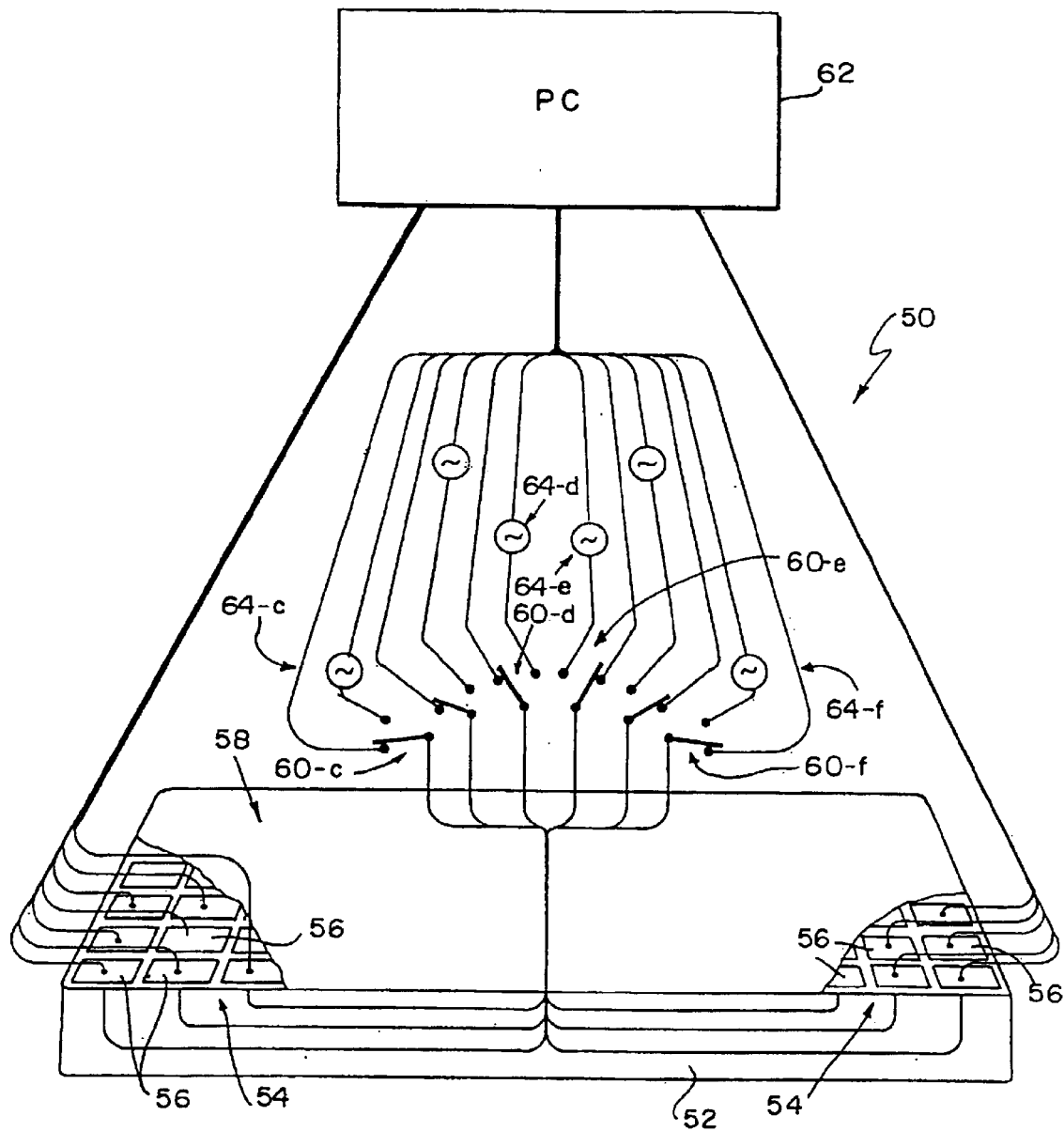

FIG. 3 illustrates a system incorporating various ones of the above described features into a bed exit or patient monitoring system 50 for, for example, a hospital bed 52. The system 50 includes an array 54 of piezoelectric transducers 56 which may, for example, be separate areas of a piezoelectric film of the type described above, electrically isolated from each other and from their surroundings, or ceramic piezoelectric transducers of the type described above, mounted in, for example, a textile or resin retainer 58 which provides electrical isolation of the various transducers 56 from each other and from their surroundings. The separate transducers 56 are each coupled to one terminal of respective single pole, double throw switches . . . 60-c, . . . 60-d, . . . 60-e, . . . 60-f, . . . and so on. Switches 60 may be hardware switches or electronic solid state switches, but may also be executed in software or firmware in, for example, a personal computer (PC) 62 which controls switches 60 according to an algorithm of the type described above which PC 62 is programmed to execute. One throw of each switch 60 is coupled to, for example, an analog-to-digital (A/D) input/output (I/O) port of PC 62 to receive the output signals from the respective transducers 56 when the system 50 is operating in the dynamic mode described above. These output signals from the transducers 56 may, for example, be time-division multiplexed into the PC 62. The other throw of each switch 60 is coupled to a signal generator 64. While separate signal generators . . . 64-*c*, . . . 64-*d*, . . . 64-*e*, . . . 64-*f*, . . . and so on, are illustrated for each respective switch . . . 60-*c*, . . . 60-*d*, . . . 60-*e*, . . . 60-*f*, . . . and so on, fewer signal generators can be employed. For example, it is contemplated that a signal generator 64 may be implemented as an output device of PC 62, or PC 62 may incorporate a digital waveform synthesis routine, with the synthesized waveform being appropriately processed, for example, amplified by an output device of PC 62, or directly supplied to the switches . . . 60-*c*, . . . 6-*d*, . . . 60-*e*, . . . 60-*f*, . . . and so on. The signal generator(s) 64 will ordinarily be under the control of the PC 62, and will only be activated when it (they) is (are) required, such as, for example, when the system 50 is operating in the static mode described above. If the signal generator(s) 64 is (are) implemented by synthesizing it (them), the signal generator 64 output(s) can also be time-division multiplexed among the transducers 56 that require excitation in the static mode of operation. And, as noted, whatever transducer(s) 56 is (are) excited by the signal generator 64 will need to be monitored, illustratively by the PC 62's A/D I/O port, to determine, for example, the voltage(s) across the transducer(s) 56 in response to excitation. From this (these) measure(s), the impedance(s) of the transducer(s) 56 being excited can be determined, and from the impedance(s), the force(s) on the transducer(s) 56 being excited.

What is claimed is:

1. A monitoring system comprising a first, piezoelectric device which is subject to a force to be monitored, and a second device for determining the first device's output and for correlating the first device's output with the force, the second device including a sweep signal generator for causing a sweeping signal to be applied to the first device and an impedance determining circuit for causing the impedance of the first device to the applied swept signal to be determined.

2. The apparatus of claim 1 comprising a plurality of said first devices coupled together in an array.

3. The apparatus of claim 1 wherein the second device comprises a switch for controlling the second device for determining the first device's output and for correlating the first device's output with the force, the switch having a first state corresponding to a first mode of operation of the second device and a second state corresponding to a second mode of operation of the second device.

4. The apparatus of claim 3 wherein switching of the switch to the second state causes a signal to be applied by the signal generator to the first device and causes the second device to determine the impedance of the first device to the applied signal.

5. The apparatus of claim 4 wherein the second device comprises a second device for determining from the impedance the force applied to the first device.

6. The apparatus of claim 5 wherein the second device comprises a second device for determining from the determined force whether an object is on the first device.

7. The apparatus of claim 3 wherein the second device comprises a second device for detecting a relatively large signal generated by the first device, placing the second device in a second state when the relatively large signal is detected, then determining if the signal generated by the first device varies at a predetermined rate over a predetermined time, and then concluding that an object is still exerting force on the first device.

8. The apparatus of claim 3 wherein the second device comprises a second device for detecting a relatively large signal generated by the first device, then placing the second device in a second state when the signal decreases over a brief time interval below some minimum threshold, then switching to the second mode, and determining if a relatively constant force is being applied.

9. The apparatus of claim 4 wherein the second device comprises a second device for determining from the first device's impedance the force that is being applied to the first device.

10. The apparatus of claim 1 wherein the first device comprises a piezoelectric ceramic transducer.

11. The apparatus of claim 10 comprising an array of said piezoelectric ceramic transducers.

12. The apparatus of claim 10 wherein the ceramic transducer is custom fabricated to a particular size, shape, and electrical properties.

13. The apparatus of claim 2 further comprising a third device for holding the plurality of first devices in the array.

14. The apparatus of claim 10 wherein the first device is oriented at a strategic load-bearing point.

15. The apparatus of claim 10 comprising a plurality of first devices coupled together and oriented at a plurality of strategic load bearing points.

16. The apparatus of claim 10 wherein the second device comprises a switch for controlling the second device for determining the first device's output and for correlating the first device's output with the applied force, the switch having a first state corresponding to a first mode of operation and a second state corresponding to a second mode of operation.

17. The apparatus of claim 16 wherein switching of the switch to the second state causes a signal to be applied by the signal generator to the first device and causes the second device to determine the impedance of the first device to the applied signal.

18. The apparatus of claim 17 wherein the second device comprises a second device for determining from the impedance the force on the first device.

19. The apparatus of claim 18 wherein the second device comprises a second device for determining from the determined force whether an object is exerting force on the first device.

20. The apparatus of claim 16 wherein the second device comprises a second device for detecting a relatively large signal generated by the first device, placing the second device in a second state when the relatively large signal from the first device is detected, then determining if the signal generated by the first device varies at a predetermined rate over a predetermined time, and then concluding that an object is exerting force on the first device.

21. The apparatus of claim 16 wherein the second device comprises a second device for detecting a relatively large signal generated by the first device, placing the second device in a second state when the signal decreases relatively rapidly to below a minimum threshold, then switching to the second mode, and then determining if a relatively constant force is being applied on the first device.

22. The apparatus of claim 17 wherein the second device comprises a second device for determining from the first device's impedance the force applied to the first device.

23. The apparatus of claim 1 wherein the first device comprises a flexible piezoelectric film.

24. The apparatus of claim 23 wherein the flexible piezoelectric film is custom fabricated to a particular size, shape, and electrical properties.

25. The apparatus of claim 23 wherein the flexible piezoelectric film comprises an array of said first devices.

26. The apparatus of claim 23 wherein the second device comprises a switch for controlling the second device for determining the first device's output and for correlating the first devices's output with the force, the switch having a first state corresponding to a first mode of operation and a second state corresponding to a second mode of operation.

27. The apparatus of claim 26 wherein switching of the switch to the second state causes a signal to be applied by the signal generator to the first device and causes the second device to determine the impedance of the first device to the applied signal.

28. The apparatus of claim 27 wherein the second device comprises a second device for determining from the impedance the force on the first device.

29. The apparatus of claim 28 wherein the second device comprises a second device for determining from the determined force whether an object is exerting force on the first device.

30. The apparatus of claim 26 wherein the second device comprises a second device for detecting a relatively large signal generated by the first device, placing the second device in a second state when the relatively large signal from the first device is detected, then determining if the signal generated by the first device varies at a predetermined rate over a predetermined time, and then concluding that an object is exerting force on the first device.

31. The apparatus of claim 26 wherein the second device comprises a second device for detecting a relatively large signal generated by the first device, placing the second device in a second state when the signal decreases relatively rapidly to below a minimum threshold, then switching to the second mode, and then determining if a relatively constant force is being applied on the first device.

32. The apparatus of claim 27 wherein the second device comprises a second device for determining from the first device's impedance the force applied to the first device.

33. A monitoring system comprising a first, piezoelectric device which is subject to a force to be monitored, and a second device for determining the first device's output and for correlating the first device's output with the force, the second device including a signal generator for causing a signal to be applied to the first device and an impedance determining circuit for causing the impedance of the first device to the applied signal to be determined, and the first device including a coaxial cable including a center conductor, a shield, and a piezoelectric material between the center conductor and shield.

34. The apparatus of claim 33 wherein the second device comprises a switch for controlling the second device for determining the first device's output and for correlating the first device's output with the force, the switch having a first state corresponding to a first mode of operation and a second state corresponding to a second mode of operation.

35. The apparatus of claim 34 wherein switching of the switch to the second state causes a signal to be applied by the signal generator to the first device and causes the second device to determine the impedance of the first device to the applied signal.

36. The apparatus of claim 35 wherein the second device comprises a second device for determining from the impedance the force on the first device.

37. The apparatus of claim 36 wherein the second device comprises a second device for determining from the determined force whether an object is exerting force on the first device.

38. The apparatus of claim 34 wherein the second device comprises a second device for detecting a relatively large signal generated by the first device, placing the second device in a second state when the relatively large signal from the first device is detected, then determining if the signal generated by the first device varies at a predetermined rate over a predetermined time, and then concluding that an object is exerting force on the first device.

39. The apparatus of claim 34 wherein the second device comprises a second device for detecting a relatively large signal generated by the first device, placing the second device in a second state when the signal decreases relatively rapidly to below a minimum threshold, then switching to the second mode, and then determining if a relatively constant force is being applied on the first device.

40. The apparatus of claim 35 wherein the signal generator comprises a sweep signal generator for sweeping the signal frequency and determining the first device's impedance in response to the swept signal frequency.

41. The apparatus of claim 35 wherein the second device comprises a second device for determining from the first device's impedance the force applied to the first device.

42. A monitoring method comprising providing a first, piezoelectric device which is subject to a force to be monitored, determining the first device's output, and correlating the first device's output with the force, determining the first device's output including providing a sweep signal generator for causing a sweeping signal to be applied to the first device and providing an impedance determining circuit for causing the impedance of the first device to the swept applied signal to be determined.

43. The method of claim 42 wherein providing a first device comprises providing a plurality of said first devices coupled together in an array.

44. The method of claim 42 wherein determining the first device's output comprises providing a switch having a first state corresponding to a first mode of operation when the force applied to the first device is being modulated and a second state corresponding to a second mode of operation when the force applied to the first device is not being modulated.

45. The method of claim 44 wherein switching of the switch to the second state causes a signal to be applied to the first device and causes the impedance of the first device to the applied signal to be determined.

46. The method of claim 45 further comprising determining from the impedance the force applied to the first device.

47. The method of claim 46 further comprising determining from the force whether an object is on the first device.

48. The method of claim 44 wherein determining the first device's output and correlating the first device's output with the force comprise detecting a relatively large signal generated by the first device, then determining if the signal generated by the first device varies at a predetermined rate over a predetermined time, and then concluding that an object is still on the first device.

49. The method of claim 44 wherein determining the first device's output and correlating the first device's output with the force comprise detecting a relatively large signal generated by the first device, then detecting when the signal decreases relatively rapidly to below a minimum threshold, and then determining if a relatively constant force is being applied.

50. The method of claim 45 wherein providing a signal generator for causing a signal to be applied to the first device and providing an impedance determining circuit for causing the impedance of the first device to the applied signal to be determined comprise sweeping the signal frequency and determining the first device's impedance in response to the swept signal frequency.

51. The method of claim 45 wherein determining the first device's output and correlating the first device's output with the force comprise determining from the first device's impedance the force that is being applied the first device.

52. The method of claim 46 wherein providing a first device comprises providing a piezoelectric ceramic transducer.

53. The method of claim 52 wherein providing a piezoelectric ceramic transducer comprises providing an array of piezoelectric ceramic transducers.

54. The method of claim 52 wherein providing a piezoelectric ceramic transducer comprises custom fabricating a piezoelectric ceramic transducer to a particular size, shape, and electrical properties.

55. The method of claim 53 wherein providing an array of said first devices coupled together further comprises providing a third device for holding the plurality of first devices in the array.

56. The method of claim 52 further comprising orienting the first device at a strategic load-bearing point.

57. A monitoring method comprising providing a first, piezoelectric device which is subject to a force to be monitored, determining the first device's output, and correlating the first device's output with the force; wherein determining the first device's output comprises providing a switch having a first state when the force applied to the first device is being modulated and a second state when the force applied to the first device is not being modulated, providing a signal generator for causing a signal to be applied to the first device, and providing an impedance determining circuit for causing the impedance of the first device to the applied signal to be determined.

58. The method of claim 57 wherein determining the first device's output and correlating the first device's output with the force comprise determining from the impedance the force on the first device.

59. The method of claim 58 wherein determining the first device's output and correlating the first device's output with the force comprise determining from the determined force whether an object is exerting force on the first device.

60. The method of claim 57 wherein determining the first device's output and correlating the first device's output with the object's status comprise detecting a relatively large signal generated by the first device, then determining if the signal generated by the first device varies at a predetermined rate over a predetermined time, and then concluding that the object is exerting force on the first device.

61. The method of claim 57 wherein determining the first device's output and correlating the first device's output with the object's status comprise detecting a relatively large signal generated by the first device, then detecting when the signal relatively rapidly to below a minimum threshold, and then determining if a constant force is being applied.

62. The method of claim 57 wherein providing a signal generator for causing a signal to be applied to the first device and providing an impedance determining circuit for causing the impedance of the first device to the applied signal to be determined comprise sweeping the signal frequency and determining the first device's impedance in response to the swept signal frequency.

63. The method of claim 57 wherein determining the first device's output and correlating the first device's output with the object's status comprise determining from the first device's impedance the force applied to the first device.

64. The method of claim 62 wherein providing a first device comprises providing a plurality of first devices coupled together and oriented at a plurality of strategic load-bearing points.

65. The method of claim 42 wherein providing a first device comprises providing a flexible piezoelectric film.

66. The method of claim 65 wherein providing a flexible piezoelectric film comprises custom fabricating a flexible piezoelectric film to a particular size, shape, and electrical properties.

67. The method of claim 65 wherein providing a flexible piezoelectric film comprises providing an array of said first devices.

68. A monitoring method comprising providing a first, piezoelectric device which is subject to a force to be monitored, determining the first device's output, and correlating the first device's output with the force; determining the first device's output including providing a signal generator for causing a signal to be applied to the first device and providing an impedance determining circuit for causing the impedance of the first device to the applied signal to be determined; and wherein providing a first device includes providing a coaxial cable including a center conductor, a shield, and a piezoelectric material between the center conductor and shield.

69. The method of claim 68 wherein determining the first device's output comprises providing a switch having a first state when the force applied to the first device is being modulated and a second state when the force applied to the first device is not being modulated.

70. The method of claim 69 wherein determining the first device's output and correlating the first device's output with the object's status comprise determining from the impedance the force on the firs device.

71. The method of claim 70 wherein determining the first device's output and correlating the first device's output with the object's status comprise determining from the determined force whether the object is exerting force on the first device.

72. The method of claim 69 wherein determining the first device's output and correlating the first device's output with the object's status comprise detecting a relatively large signal generated by the first device, then determining if the signal generated by the first device varies at a predetermined rate over a predetermined time, and then concluding that the object is exerting force on the first device.

73. The method of claim 69 wherein determining the first device's output and correlating the first device's output with the object's status comprise detecting a relatively large signal generated by the first device, then detecting when the signal relatively rapidly to below a minimum threshold, and then determining if a constant force is being applied.

74. The method of claim 69 wherein providing electrical signals for exciting the first device and determining the impedance of the first device to the electrical signals comprise sweeping the signal frequency and determining the first device's impedance in response to the swept signal frequency.

75. The method of claim 69 wherein determining the first device's output and correlating the first device's output with the object's status comprise determining from the first device's impedance the force applied to the first device.

76. A monitoring system comprising:
a piezoelectric device which is subject to static forces whose magnitude is to be monitored;
a voltage source providing variable frequency sweep signals to the piezoelectric device; and
a second device determining the reactance of the piezoelectric device from the piezoelectric device response to the variable frequency sweep signals and determining the magnitude of the static force from the reactance.

77. A monitoring method comprising:
providing a piezoelectric device which is subject to static forces whose magnitude is to be monitored;
providing variable frequency sweep signals;
applying variable frequency sweep signals to the piezoelectric device;
determining the reactance of the piezoelectric device from the piezoelectric device response to the variable frequency sweep signals; and
determining the magnitude of the static force from the determined reactance.

* * * * *